United States Patent
Wang et al.

(10) Patent No.: US 9,902,636 B2
(45) Date of Patent: Feb. 27, 2018

(54) METHOD OF REDUCING RESIDUAL RECALCITRANT ORGANIC POLLUTANTS

(75) Inventors: Sijing Wang, Shanghai (CN); Lei Wang, Shanghai (CN); Haiwu Zhang, Shanghai (CN); Weiqing Xu, Shanghai (CN); Ying Zhou, Shanghai (CN)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 14/424,162

(22) PCT Filed: Sep. 10, 2012

(86) PCT No.: PCT/CN2012/081177
§ 371 (c)(1),
(2), (4) Date: Feb. 26, 2015

(87) PCT Pub. No.: WO2014/036732
PCT Pub. Date: Mar. 13, 2014

(65) Prior Publication Data
US 2015/0239762 A1   Aug. 27, 2015

(51) Int. Cl.
*C02F 3/04*   (2006.01)
*C02F 3/34*   (2006.01)
(Continued)

(52) U.S. Cl.
CPC ............... *C02F 3/341* (2013.01); *C02F 3/02* (2013.01); *C02F 3/04* (2013.01); *C02F 3/106* (2013.01);
(Continued)

(58) Field of Classification Search
None
See application file for complete search history.

(56) References Cited

U.S. PATENT DOCUMENTS

| 5,126,050 A | 6/1992 | Irvine et al. |
| 5,403,487 A | 4/1995 | Lodaya et al. |

(Continued)

FOREIGN PATENT DOCUMENTS

| CL | 2014002690 A1 | 12/2014 |
| CN | 1594147 A | 3/2005 |

(Continued)

OTHER PUBLICATIONS

Research of Cosubstractes regulate the metabolic pathway of neonicotinoid insecticide imidacloprid and by Stenotrophomonas maltophilia R551-3 strain R551-3 strain, 2012.
(Continued)

*Primary Examiner* — Chester T Barry
(74) *Attorney, Agent, or Firm* — Wegman, Hessler & Vanderburg

(57) ABSTRACT

A method for reducing recalcitrant chemical oxygen demand (COD) of a liquid in a water system is provided. The method comprises pretreating the liquid in a pretreatment unit (12) to remove indigenous bacteria or microbes to a population level below which the indigenous organisms can interfere with the screened and externally introduced microorganisms. The liquid is then provided to a reactor (20) that has a filter bed (22) formed with a carrier material (26). Special microbes are screened and used to colonize the carrier material (26) to remove recalcitrant COD. A biofilm is cultured on the surface of the carrier material (26) to immobilize the screened microbes in the reactor (20). The method further comprises adding a co-substrate as the liquid enters the reactor (20) and percolating the liquid through the filter bed (22) colonized with the screened microbes to degrade at least part of the recalcitrant COD under aerobic conditions. The screened microbes comprise at least one microbial species selected from the group consisting of
(Continued)

*Bacillus, Comamonas, Arthrobacter, Micrococcus, Pseudomonas, Pediococcus, Achromobacter, Flavobacterium, Mycobacterium, Rhodanobacter, Stenotrophomonas* and yeast.

2 Claims, 3 Drawing Sheets

(51) Int. Cl.
| | |
|---|---|
| C02F 3/02 | (2006.01) |
| C02F 3/10 | (2006.01) |
| C02F 3/12 | (2006.01) |
| C02F 3/28 | (2006.01) |
| C02F 101/30 | (2006.01) |
| C02F 101/32 | (2006.01) |
| C02F 101/36 | (2006.01) |
| C02F 101/38 | (2006.01) |
| C02F 103/06 | (2006.01) |
| C02F 103/36 | (2006.01) |
| C02F 3/00 | (2006.01) |

(52) U.S. Cl.
CPC .............. C02F 3/107 (2013.01); C02F 3/108 (2013.01); C02F 3/1268 (2013.01); C02F 3/2853 (2013.01); C02F 3/348 (2013.01); C02F 2003/001 (2013.01); C02F 2003/003 (2013.01); C02F 2101/30 (2013.01); C02F 2101/327 (2013.01); C02F 2101/36 (2013.01); C02F 2101/38 (2013.01); C02F 2103/06 (2013.01); C02F 2103/365 (2013.01); C02F 2203/004 (2013.01); C02F 2305/06 (2013.01); Y02W 10/15 (2015.05)

(56) References Cited

U.S. PATENT DOCUMENTS

| | | | |
|---|---|---|---|
| 5,514,278 A | 5/1996 | Khudenko | |
| 6,059,973 A | 5/2000 | Hudson et al. | |
| 6,107,067 A * | 8/2000 | Miller | C02F 3/10 210/615 |
| 6,159,363 A | 12/2000 | Collins et al. | |
| 6,159,364 A | 12/2000 | Hirane | |
| 6,472,198 B1 | 10/2002 | Semprini et al. | |
| 6,610,204 B1 * | 8/2003 | Kroon | C02F 3/1268 210/601 |
| 7,879,235 B2 | 2/2011 | Wang | |
| 2003/0155296 A1 | 8/2003 | Boyd et al. | |
| 2003/0190742 A1 | 10/2003 | Whiteman | |
| 2004/0140448 A1 * | 7/2004 | Wu Hsiao | C02F 3/10 252/180 |
| 2006/0131230 A1 | 6/2006 | Shao et al. | |
| 2007/0178577 A1 | 8/2007 | Candussio et al. | |
| 2008/0242875 A1 * | 10/2008 | Hong | A62D 3/38 549/42 |
| 2009/0236282 A1 | 9/2009 | Wang | |
| 2010/0264082 A1 | 10/2010 | Conner | |
| 2010/0276363 A1 | 11/2010 | Hoyland | |
| 2013/0264280 A1 | 10/2013 | Zhao et al. | |

FOREIGN PATENT DOCUMENTS

| | | |
|---|---|---|
| CN | 1718548 A | 1/2006 |
| CN | 1930298 A | 3/2007 |
| CN | 101045582 A | 10/2007 |
| CN | 101259983 A1 | 9/2008 |
| CN | 101264991 A | 9/2008 |
| CN | 101333042 A | 12/2008 |
| CN | 101977854 A | 2/2011 |
| CN | 102583781 A | 7/2012 |
| EP | 0812806 A1 | 12/1997 |
| EP | 1270513 A1 | 1/2003 |
| JP | 09314156 A | 12/1997 |
| JP | 2007185596 A | 7/2007 |
| JP | 2008194023 A | 8/2008 |
| KR | 100638319 B1 | 10/2006 |
| TW | I284119 B | 7/2007 |
| TW | 200927677 A | 7/2009 |
| WO | 9532278 A1 | 11/1995 |
| WO | 2012119266 A1 | 9/2012 |

OTHER PUBLICATIONS

Unofficial English Translation of Chinese Office Action issued in connection with corresponding CN Application No. 201280075729.4 dated Apr. 22, 2016.

Xuelian, "A Study on Trichloroethylene Degradation by Aerobic Cometabolism and Volatile Model", Environmental Engineering, 2006.

Shan et al., "Biodegradation of Malathion by Acinetobacter Johnsoii MA19 and Optimization of Cometabolism Substrates", Journal of Environmental Sciences, Volume No. 21, Issue No. 01, pp. 76-82, 2009.

Unofficial English Translation of Chile office action issued in connection with corresponding CL Application No. 0481-15 dated Feb. 27, 2015.

Unofficial English Translation of Chinese office action issued in connection with corresponding CN Application No. 201280075729.4 dated Aug. 29, 2016.

Yingzi et al., "Study on Metabolism Action of Co-substrate to Non-Biodegradable Organics", Academic Journal of Architectural Engineering Institute, vol. No. 28, Issue No. 2, pp. 26-28, Apr. 2011.

Unofficial English translation of Chinese Office Action issued in connection with corresponding CN Application No. 201280075729.4 dated Nov. 23, 2015.

International Search Report and Written Opinion dated Jun. 13, 2013 which was issued in connection with PCT Patent Application No. PCT/CN2012/081177 which was filed on Sep. 10, 2012.

European Search Report and Opinion issued in connection with corresponding EP Application No. 2884072.5 dated Apr. 1, 2016.

PCT Search Report and Written Opinion issued in connection with related PCT Application No. PCT/CN20011/000359 dated Dec. 8, 2011.

PCT International Preliminary Report on Patentability issued in connection with related PCT Application No. PCT/CN20011/000359 dated Sep. 10, 2013.

Chinese Office Action issued in connection with related CN Application No. 201180069051.4 dated Jul. 8, 2014.

European Search Report and Opinion issued in connection with related EP Application No. 11860393.5 dated Sep. 9, 2014.

Chinese Office Action issued in connection with related CN Application No. 201180069051.4 dated Jan. 15, 2015.

US Non-Final Office Action issued in connection with related U.S. Appl. No. 14/003,667 dated Sep. 11, 2015.

Taiwan Office Action issued in connection with related TW Application No. 101107742 dated Nov. 10, 2015.

Australian Notice of Allowance issued in connection with related AU Application No. 2011361565 dated Oct. 6, 2016.

US Final Office Action issued in connection with related U.S. Appl. No. 14/003,667 dated Oct. 6, 2016.

Korean Office Action issued in connection with related KR Application No. 1020137023267 dated May 3, 2017.

US Non-Final Office Action issued in connection with related U.S. Appl. No. 14/003,667 dated May 18, 2017.

Sijing Wang et al, filed Sep. 6, 2013, U.S. Appl. No. 14/003,667.

* cited by examiner

METHOD OF REDUCING RESIDUAL RECALCITRANT ORGANIC POLLUTANTS

BACKGROUND OF THE INVENTION

Field of the Invention

Embodiments of the invention relate to a process and system for reduction of chemical oxygen demand, herein referred to as COD, and more particularly to a process and system that immobilizes select microorganisms in a stable biofilm on a carrier material.

Description of Related Art

Wastewater from an industry may be organic or inorganic in nature or a combination of both. In most cases, it contains toxic ingredients, which can pose a direct threat to human beings and animals. Another direct effect of wastewater pollution is to deplete, through the excessive organic load, the dissolved oxygen (DO) content of receiving waters to the point that the stream becomes incapable of exercising the self-purification processes. The deoxygenation may be high enough to practically destroy all fish and other aquatic life. The problem is compounded by the fact that solubility of oxygen in water is very low, less than 12 mg/l. This oxygen comes from two sources, viz. diffusion from the atmosphere at the air/water interface and as a by-product of photosynthesis. Photosynthetic organisms, such as plants and algae, produce oxygen when there is a sufficient light source. During times of insufficient light, these same organisms consume oxygen, resulting in the depletion of DO levels.

Biochemical Oxygen Demand (BOD) and Chemical Oxygen Demand (COD) are indices of the biologically degradable and chemically oxidizable fractions of the wastewater, respectively. COD of the treated effluent is representative of the effectiveness of a treatment technique in its ability to remove the total organic material present in the influent. These parameters are frequently used to define influent and effluent characteristics and also ensure the wastewater treatment efficiency.

Recalcitrant COD refers to organic compounds that resist microbial degradation (bio-refractory) or are not readily biodegradable. Existing biological treatment technologies including the activated sludge process, biological filtration or membrane bioreactors (MBR) cannot efficiently remove these recalcitrant COD compounds. Adsorption and oxidation may be able to remove or destruct these organic compounds, but the cost is often very high.

SUMMARY OF THE INVENTION

In one exemplary aspect of the invention, a method is provided for reducing the recalcitrant chemical oxygen demand (COD) of a liquid in a water system. The target water to be treated in this invention has been treated sufficiently in prior steps, such as the primary and secondary treatment processes in a typical conventional wastewater treatment plant, to remove readily biodegradable organic compounds such that the $BOD_5$/COD ratio is lower than 0.2, desirably lower than 0.1. The method includes further pretreating the liquid in a pretreatment unit to remove indigenous bacteria or microbes to a population level below which the indigenous organisms can interfere with the efficient biodegradation of the recalcitrant COD by the externally introduced bacteria or microbes in the subsequent treatment unit. The liquid is then provided to a reactor that has a filter bed formed with a carrier material. Highly efficient microorganisms or microbial consortium are screened and used to colonize the carrier material to remove recalcitrant COD. A biofilm is cultured on the surface of the carrier material to immobilize the screened microbes in the reactor. A co-substrate is added to the liquid to enhance biofilm formation on the surface of the carrier material. The method further includes percolating the liquid from the pretreatment unit through the filter bed colonized with the screened microbes to degrade at least part of the recalcitrant COD under aerobic conditions. In one embodiment, the filter is formed with a carrier material with biofilm and the screened microbes comprise at least one microbial species selected from the group consisting of *Bacillus, Comamonas, Arthrobacter, Micrococcus, Pseudomonas, Pediococcus, Achromobacter, Flavobacterium, Mycobacterium, Rhodanobacter, Stenotrophomonas* and yeast.

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings.

Corresponding reference characters indicate corresponding parts throughout the views of the drawing.

DETAILED DESCRIPTION OF THE INVENTION

The invention will now be described in the following detailed description with reference to the drawings, wherein embodiments are described in detail to enable practice of the invention. Although the invention is described with reference to these specific embodiments, it will be understood that the invention is not limited to these embodiments. But to the contrary, the invention includes numerous alternatives, modifications, and equivalents as will become apparent from consideration of the following detailed description.

Figure 1:
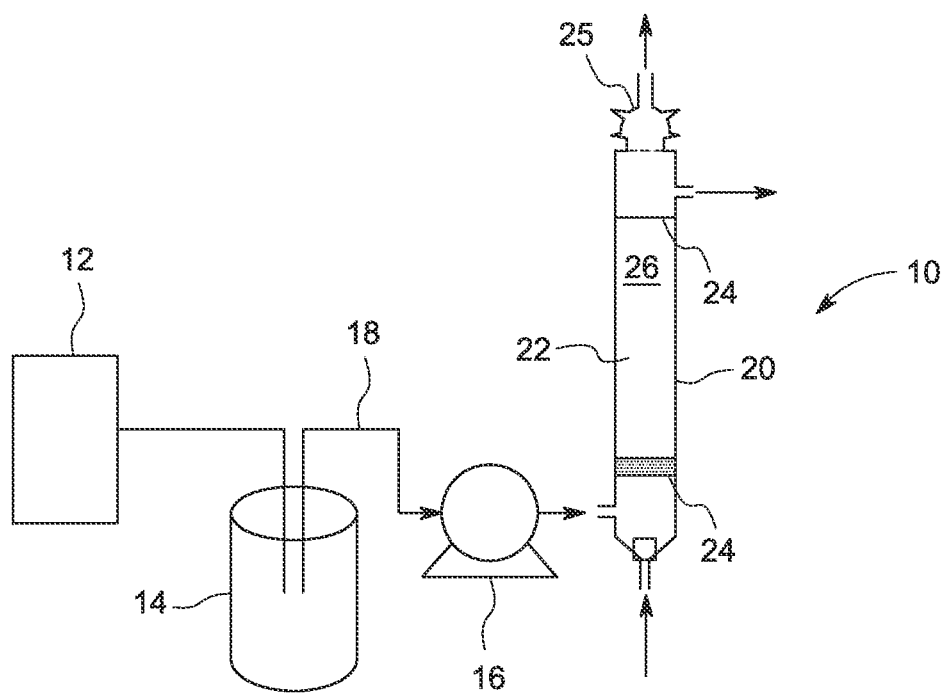
FIG. 1 shows a schematic view of a water treatment system for reducing recalcitrant organic pollutants according to an embodiment of the invention.

FIG. 1 shows a water treatment system 10 for removal of residual pollutants in a treated wastewater. Desirably, the target water to be treated in system 10 has been fully treated in prior steps by a biological process to remove the readily biodegradable pollutants such that its effluent $BOD_5$ is less than 30 ppm, more desirably less than 10 ppm, or even less than 5 ppm. The major residual pollutants targeted by the water treatment system 10 are recalcitrant COD that remain after conventional primary and secondary wastewater treatment and membrane based water treatment (e.g., MF/UF, MBR). Recalcitrant COD refers to organic compounds that resist microbial degradation (bio-refractory) or are not readily biodegradable. The water treatment system 10 treats a polluted aqueous liquid which contains recalcitrant COD in order to decompose at least a portion of these compounds to lower the COD value of the liquid. The water treatment system 10 may also be used for removal of recalcitrant COD in other water bodies, such as surface water and ground water.

The liquid stream to be treated is initially pretreated in a pretreatment unit 12. The pretreatment unit 12 removes indigenous bacteria or microbes to a population level below which the indigenous organisms can interfere with the screened and externally introduced microorganisms in reactor 20. In one embodiment, the pretreatment unit is a filtration unit where MF or UF membrane or media filtration is employed. In another embodiment, the pretreatment unit 12 is combined with prior steps for simultaneous biological treatment and membrane filtration such as in MBR. As desired pretreatment units 12 are well known to those skilled in the art, further discussion of the pretreatment unit 12 need not be included herein.

The liquid to be treated is sent from the pretreatment unit 12 to a feed tank 14. The feed tank 14 is desirably provided with an agitator driven by a motor. The feed tank 14 may also serve as a storage or equilibrium tank. By means of a pump 16 arranged in conduit 18, the liquid to be treated is pumped at a predetermined flow rate to a reactor 20 containing a packed filter bed 22. In one embodiment, the liquid to be treated is pumped from the feed tank 14 using a pump 16 at a substantially constant flow rate to the bottom of the reactor 20 for continuous treatment. Alternately, a diffuser (not shown) on bottom of the filter bed 22 may distribute the liquid to be treated over the filter bed 22. As is known in the art, the diffuser may be composed of a large number of small tube sections. One skilled in the art will understand that other means for feeding the liquid to be treated to the reactor 20 may also be used without departing from the scope of the invention. For example, it is also possible to distribute the liquid by spraying over the top of the filter bed 22. On the ends of the filter bed 22, a course filter layer 24 of plastic matrices or a screen may be arranged in the reactor 20 so that particles of the filter bed 22 are kept in the reactor 20 without hampering the passage of the percolate flowing out of the filter bed 22. The reactor may be vented through vent 25.

The filter bed 22 is desirably formed with a carrier material 26. A biofilm is formed on the surface of the carrier material 26 by employing microbial culturing techniques. Any material that will support biofilm formation is suitable as a carrier material 26. One example is volcanic rock. The efficacy may be further improved by selecting a carrier material 26 that is an adsorbent for at least part of the organic compounds in the water to be treated so that these compounds are withdrawn from the water and concentrated on the surfaces of the carrier material 26. In this way, these compounds can more efficiently be decomposed by microbes colonizing the carrier material 26. Suitable adsorbent carrier materials include activated carbon containing materials, like granular activated carbon (GAC), lignite, zeolites, and synthetic adsorbent materials, such as macroporous resins.

According to one aspect of the invention, highly efficient microbes and enzymes, hereinafter "the screened microbes, or microorganisms" or "screened bacteria", are used to colonize the carrier material 26 and biodegrade the recalcitrant COD. The selected microbes and enzymes (or their mixtures) are immobilized by the carrier material 26 within the reactor 20. It has been found that indigenous bacteria greatly reduce the efficiency of the screened bacteria, as the screened bacteria are not dominant, and the screened bacteria cannot effectively compete and maintain its desired function in the presence of a large amount of indigenous bacteria. Accordingly, the native bacterial species are substantially removed or minimized in the pretreatment unit 12 to reduce contamination of the seeded biofilm. In order to enable the screened bacteria to break down the non-biodegradable organic compounds, the $BOD_5/COD$ ratio of the water to be treated should be sufficiently low, lower than 0.2, or desirably even lower than 0.1, in order to avoid competition with other bacteria which decompose biodegradable organic compounds and which can thus grow or develop much quicker than the screened bacteria. $BOD_5$ is the biochemical oxygen demand of wastewater during decomposition occurring over a 5-day period.

Screening highly efficient microorganisms and/or bioaugmentation products which are good at removing the target pollutants (e.g., recalcitrant COD) may involve a variety of techniques including microbial screening, microbial isolation such as from the sites or water bodies polluted with the target recalcitrant organic compounds, microbial culturing, and assessment of biodegradation efficiency for removal of the target recalcitrant pollutants. The present invention can be practiced using bacteria or microbes that can efficiently degrade the target recalcitrant organic compounds. This invention, however, is not limited to specific microbes, or to any one method of obtaining or preparing these microbes. The commercially available microbes and bioaugmentation products that show capability of efficiently biodegrading the target recalcitrant organic compounds can be used in the scope of the present invention.

In one embodiment, a screened microorganism mixture comprises at least one microbial species selected from the group consisting of *Bacillus, Comamonas, Arthrobacter, Micrococcus, Pseudomonas, Pediococcus, Achromobacter, Flavobacterium, Mycobacterium, Rhodanobacter, Stenotrophomonas* and yeast. In another embodiment, screened pure microbes or the mixture of the screened pure microbial strains are used as inoculum to seed the reactor to form biofilm. These screened microbes are so-called specialist microbes which grow or develop usually slower than the bacteria in conventional activated sludge water purification installations for the biological treatment of domestic wastewater.

A dense and stable biofilm is formed on the surface carrier material 26 by employing microbial culturing techniques. Desirably the liquid used for the microbial culturing is from the target pollutant water to be treated containing target recalcitrant organic compounds. This will help the externally introduced microorganisms to be simultaneously acclimated to the water to be treated and may improve toxicity tolerance. Additional nutrients may be added to facilitate microbial growth and formation of the biofilm on the carrier materials. The additional nutrients may include carbon sources, nitrogen sources, phosphorous sources and mineral elements required for microbial growth and biofilm formation. Desirably, air sparging or other methods of oxygenation are provided to the reactor 20 for biofilm growth and maintenance and for biodegradation of the target pollutants.

In the process according to the invention, the polluted water is percolated through a packed filter bed 22 of a carrier material 26 which is colonized with microbes which enable to degrade at least part of the non-biodegradable organic compounds under aerobic conditions. The recalcitrant COD containing water stream passes through the reactor 20 for a retention period. With combination of adsorption by the carrier material 26 and biodegradation, recalcitrant COD is removed. As the selected microbes/enzymes are immobilized as biofilm and are not mixed with large amount of indigenous microorganisms, they can maintain their super catabolic capabilities on the recalcitrant COD over a long time. By combining adsorption on the carrier materials and biodegradation by selected screened microorganisms, the reactor 20 provides efficient removal of recalcitrant COD.

Cometabolism may be employed to enhance removal of the recalcitrant COD in this invention. Biodegradable organic compounds can be grouped into two categories according to whether energy is directly available to the microorganism for cell growth and maintenance during their biotransformation. Organics whereby the bio-oxidation of which provides energy and carbon directly for cell growth and maintenance are categorized as growth substrates. In this case, cells grow by consuming the growth substrates. On the other hand, the biotransformation of non-growth substrates (the other category) supplies no or negligible direct energy for cell synthesis and maintenance. Consequently, cell growth is impossible or negligible when the non-growth substrates are the only organic compounds available, even when other essential growth nutrients are present. Biotransformation of a non-growth substrate without nutrimental benefit in the presence of a growth substrate is called cometabolism.

Many organic compounds of environmental and toxicological significance can be transformed through cometabolism, and it can be employed in this invention to enhance removal of recalcitrant COD. Products of growth-associated biodegradation are $CO_2$, $H_2O$, and cell biomass. Besides supporting cell growth, growth substrates also serve to induce the enzymes and cofactors required for cometabolism. The enzymes involved in cometabolic reactions usually act on a series of closely related molecules, and are not absolutely specific for a single substrate. Some even catalyze a single type of reaction on a variety of structurally dissimilar molecules. The non-growth substrate is not assimilated in cometabolism, but the cometabolically transformed product can be a growth substrate for other organisms in a mixed culture.

The efficacy of the biofilm may be enhanced by dosing a small amount of a co-substrate into the target feed wastewater. Co-substrates capable of inducing the enzymes involved in the mineralization of the intermediates of the targeted recalcitrant organic compounds are most effective. Accordingly, the preferred co-substrate may vary with the type of wastewater stream being treated. The co-substrates of the present invention are particularly suited to wastewater from a crude oil refinery where the typical recalcitrant organics found in effluents may contain polycyclic aromatic hydrocarbons, heteroaromatic compounds, chlorinated aromatic compounds, nitroaromatic compounds, aromatic amines, aromatic olefins, aromatic esters, biphenyl, organic cyanides, etc. The co-substrate may be added to the storage tank 14 or to the liquid as it is pumped through conduit 18 to reactor 20. Supplementing microbial population with a co-substrate serves to induce the activation of cometabolic enzymes to enhance biodegradation of the recalcitrant pollutants or their intermediates. It also serves to support microbial growth and maintain a stable biofilm on the carriers, thus improving the physical integrity of the biofilm itself. Co-substrate concentrations of about 20 ppm or less by volume of the liquid to be treated have been found effective. In an embodiment, co-substrates that are readily biodegraded by one or more microbes in the screened microbe mixture. Suitable co-substrates include, but are not limited to, phthalic acid, phthalic acid salts, benzoic acid, benzoic acid salts, succinic acid, succinic acid salts, like sodium succinate dibasic hexahydrate, fumaric acid, and fumaric acid salts.

In one embodiment, phthalic acid is added to the liquid to be treated for removal of recalcitrant COD which may contain phenolic compounds, conjugated aromatic hydrocarbons or heteroaromatic-conjugated hydrocarbons, such as often seen in crude oil refinery wastewater treatment effluent. More specifically, the recalcitrant COD may include, but is not limited to, methyl tert-butyl ether, isoquinoline, indole, and 2-phenoxyethanol. In one embodiment, phthalic acid may be dosed directly into the feed tank 14 to be mixed well with the influent water to be treated. Besides supporting microbial growth, it is postulated that phthalic acid can induce or activate enzymes such as monooxygenase and dioxygenase which also help cometabolic transformation of other recalcitrant organic compounds or their intermediates.

The above process mainly targets at removing residual recalcitrant organic contaminants that still remain untreated after a normal biological wastewater treatment such as activated sludge process or MBR system. The selected microorganisms are more capable and more efficient in biodegradation of the residual organic pollutants compared to the indigenous microorganisms in the water streams or in the activated sludge. In contrast to a normal bioaugmentation where a group of non-native microorganisms are dosed to an existing biological wastewater treatment process and mixed with the native microorganisms, in this invention, the selected microorganisms are immobilized in carriers such as granular activated carbon (GAC), volcanic rock, lignite, zeolites, and synthetic adsorbent materials, such as macroporous resins. The immobilized microorganisms will not only have stronger acclimation to the new conditions and higher toxicity tolerance, they also can maintain their specific metabolic capability of biodegrading the target recalcitrant pollutants over a long time. The efficacy of the biofilm may be enhanced by dosing a small amount of a co-substrate such as phthalic acid or salts of phthalic acid.

EXAMPLES

The invention will now be further described with reference to the following examples which are to be regarded solely as illustrative and not as restricting the scope of the invention.

For all the examples, a pretreatment unit 12 having an MBR system comprising anoxic tank, aerobic tank and membrane tank was used for treatment of refinery wastewater. The feed wastewater was a synthetic refinery wastewater which contained 80 mg/L emulsified oil prepared from a crude oil, 100 mg/L phenol, 30 mg/l 2,4,6-TCP (2,4,6-trichlorophenol), 70 mg/l MTBE (methyl tert-butyl ether), 70 mg/l isoquinoline, 70 mg/l indole, 30 mg/l 2-phenoxyethanol, and other types of carbon, nitrogen, phosphate and mineral elements. The total COD, ammonia nitrogen and total nitrogen of the feed wastewater were in the ranges of 1000-1300 mg/L, 20-70 mg/L, and 80-130 mg/L, respectively. GE's "ZeeWeed" hollow fiber membrane ZW500D was used. Stable and efficient treatment was achieved. The MBR effluent COD, ammonia nitrogen and total nitrogen were in the range of 70-130 mg/L, 0-2 mg/L and 10-50 mg/L, respectively. Part of the MBR effluent was collected in a feed tank 14 for use as the influent water for the polishing COD reduction treatment system. The MBR effluent $BOD_5$ was always found to be less than 5 mg/L during the whole testing period.

Seven identical size glass column reactors 20 filled with a carrier material were prepared. As shown in FIG. 1, for each reactor, the inner column diameter was 25 mm, the static carrier material bed height 26 was 340 mm, and the working liquid volume in the carrier material-filled column was about 60 ml. De-ionized water was used to flush and clean the carrier material at 8 ml/min for 24 hrs before both the influent and effluent valves were closed for nutrient loading and microbial culturing.

Column Reactors No. 1 through No. 4 were filled with GAC as the carrier material. Reactors No. 1 through 3 were charged with 0.3 g Oxoid® Tryptone Soya Broth and the influent water to be treated and were sparged with air to mix the nutrients and the carrier material. A screened microorganism mixture comprising *Bacillus, Pseudomonas, Comamonas, Rhodanobacter* and *Stenotrophomonas* was used for inoculation. After 3 days, another 0.15 g Oxoid® Tryptone Soya Broth was supplemented to the reactor. After 5 days, another 0.15 g Oxoid® Tryptone Soya Broth was supplemented to the reactors. Air sparging was kept at 100 ml/min during the microorganism culturing for biofilm formation and then adjusted to around 60 ml/min during the subsequent biodegradation treatment. After culturing the microbial mixture for 7 days, a stable and dense biofilm was formed on the carrier material surface. Then both influent and effluent valves were opened and pretreated water from the feed tank 14 was pumped by a peristaltic pump 16 at a constant flow rate of 0.6 ml/min to the reactor 20 bottom for continuous treatment. The pretreated water, or liquid feed, to Reactors No. 1 and No. 2 was also dosed with a co-substrate. A control, Reactor No. 4, was filled only with carrier material and no biofilm for comparison.

Column Reactors No. 5 through No. 7 were filled with volcanic rocks as the carrier material. The diameter of the volcanic rocks ranged from about 0.5 mm to about 2.5 mm. Reactors No. 5 and 6 were charged with 0.3 g Oxoid® Tryptone Soya Broth and the influent water to be treated and sparged with air to mix the nutrients and the carrier material. The same microorganism mixture as used for Reactors No. 1 through 3, above, was used for inoculation. After 3 days, another 0.15 g Oxoid® Tryptone Soya Broth was supplemented to the reactor. Every 48 hours, another 0.15 g Oxoid® Tryptone Soya Broth was supplemented to the reactor. Air sparging was kept at 100 ml/min during the microorganism culturing for biofilm formation and then adjusted to around 60 ml/min during the subsequent biodegradation treatment. After culturing the microbial mixture 14 days, a stable and dense biofilm was formed on the carrier material surface. Then both influent and effluent valves were opened and pretreated water from the feed tank 14 was pumped by a peristaltic pump 16 at a constant flow rate of 0.6 ml/min to the reactor 20 bottom for continuous treatment. The pretreated water, or liquid feed, to Reactor No. 5 was also dosed with a co-substrate. A control, Reactor No. 7 was filled only with carrier material and no biofilm for comparison.

Example 1—5 Ppm Co-Substrate

For Example 1, the reactor (No. 1) had GAC as the carrier material, the microorganism mixture above, and a co-substrate. The influent wastewater was dosed with 5 ppm phthalic acid ($C_8H_6O_4$) as the co-substrate.

Example 2—20 Ppm Co-Substrate

For Example 2, the reactor (No. 2) had GAC as the carrier material, the microorganism mixture above, and a co-substrate. The influent wastewater was dosed with 20 ppm phthalic acid ($C_8H_6O_4$) as the co-substrate.

Comparative Example 1—No Co-Substrate

For Comparative Example 1, the reactor (No. 3) had GAC as the carrier material and the microorganism mixture above. No co-substrate was added.

Control Example 1—No Microorganisms

For Control Example 1, the reactor (No. 4) had GAC as the carrier material. No microorganisms or co-substrates were added.

Example 3—5 Ppm Co-Substrate

For Example 3, the reactor (No. 5) had volcanic rock as the carrier material, the microorganism mixture above, and a co-substrate. The influent wastewater was dosed with 5 ppm phthalic acid ($C_8H_6O_4$) as the co-substrate.

Comparative Example 2—No Co-Substrate

For Comparative Example 2, the reactor (No. 6) had volcanic rock as the carrier material and the microorganism above. No co-substrate was added.

Control Example 2—No Microorganisms

For Control Example 2, the reactor (No. 7) had volcanic rock as the carrier material. No microorganisms or co-substrates were added.

Results

Figure 2:
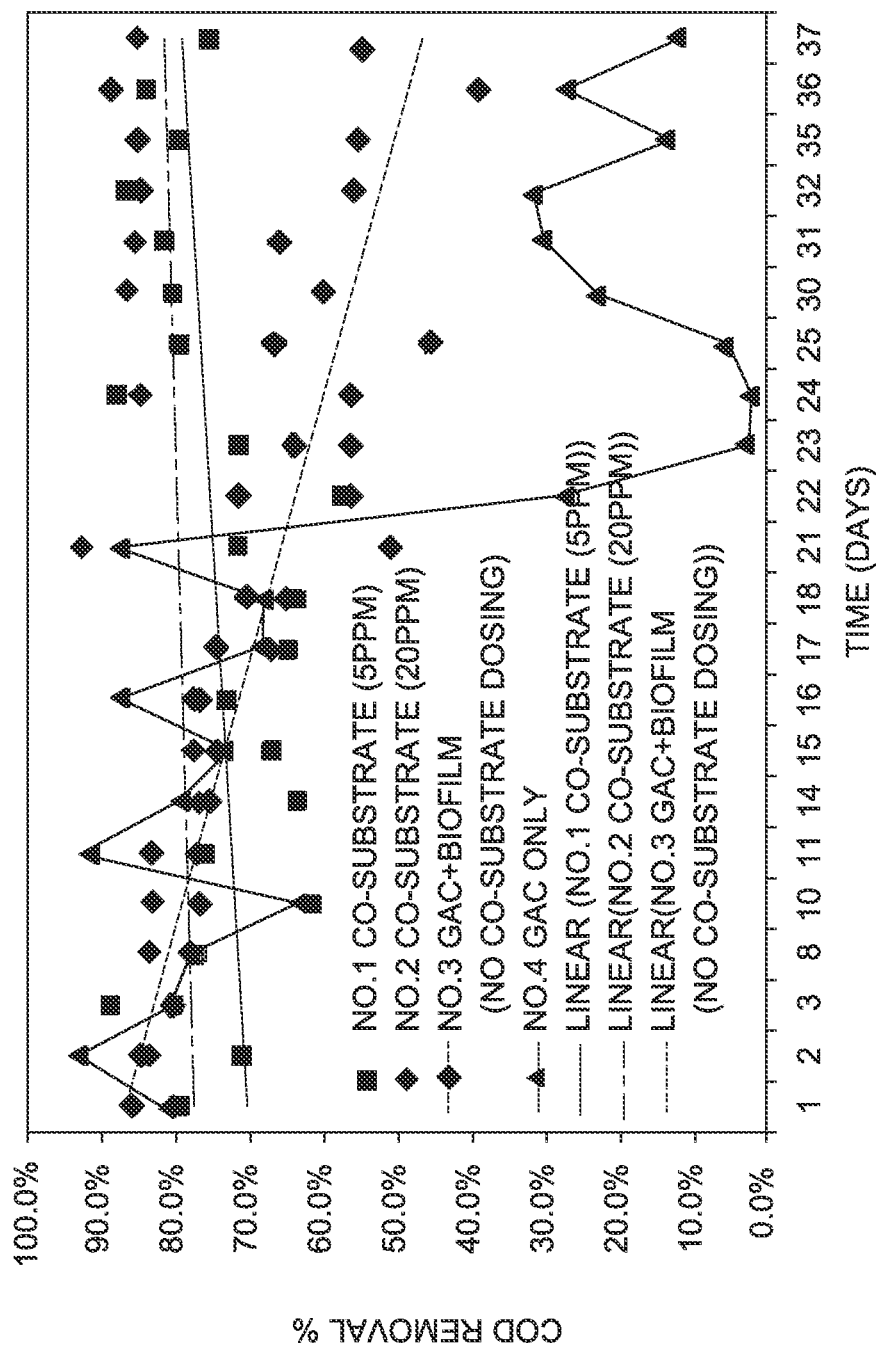
FIG. 2 is a graph of the COD Removal % when using GAC with various water treatments with respect to time.
Figure 3:
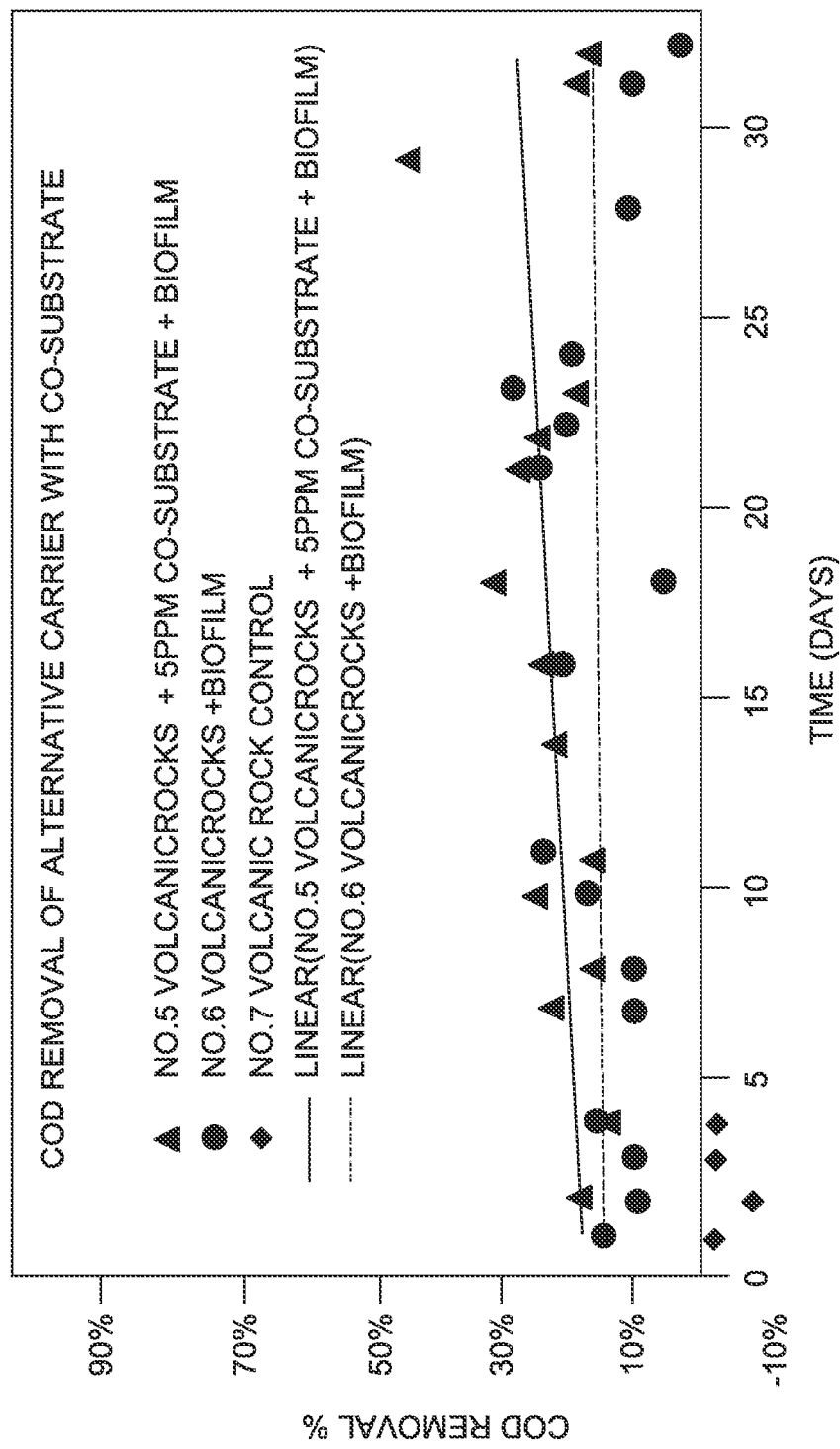
FIG. 3 is a graph of the COD Removal % when using volcanic rock carrier material with various water treatments with respect to time.

The reactors in the above examples were tested for more than one month. The treatment results using GAC as the carrier material are shown in FIG. 2. The treatment results using volcanic rock as the carrier material are shown in FIG. 3.

The contribution of the co-substrate to COD was excluded for COD removal % calculation. As shown in FIG. 2 and FIG. 3, dosing the feed water with a co-substrate material increased the COD removal %.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

The invention claimed is:

1. A method for reducing the recalcitrant chemical oxygen demand (COD) of a liquid in a water system, the method comprising the steps of:
   providing a reactor having a filter bed with carrier material disposed therein;
   screening microbes that can reduce recalcitrant COD from said liquid and colonizing said carrier material with said screened microbes;
   culturing a biofilm on said carrier material to immobilize said screened microbes in said filter bed;

pretreating said liquid in a pretreatment unit to reduce the amount of indigenous bacteria or microbes in said liquid to a population level below which said indigenous bacteria or microbes will interfere with said screened microbes that have been colonized on said carrier material;

adding at least one co-substrate to said pretreated liquid then feeding said pretreated liquid to said reactor; and percolating the pretreated liquid through said filter bed that has been colonized with said screened microbes for a retention time sufficient to degrade at least a portion of said recalcitrant COD under aerobic conditions, wherein a $BOD_5$/COD ratio of said pretreated liquid after exiting said pretreatment unit is less than 0.2.

2. A method for reducing the recalcitrant chemical oxygen demand (COD) of a liquid in a water system, the method comprising the steps of:

providing a reactor having a filter bed with carrier material disposed therein;

screening microbes that can reduce recalcitrant COD from said liquid and colonizing said carrier material with said screened microbes;

culturing a biofilm on said carrier material to immobilize said screened microbes in said filter bed;

pretreating said liquid in a pretreatment unit to reduce the amount of indigenous bacteria or microbes in said liquid to a population level below which said indigenous bacteria or microbes will interfere with said screened microbes that have been colonized on said carrier material;

adding at least one co-substrate to said pretreated liquid then feeding said pretreated liquid to said reactor; and percolating the pretreated liquid through said filter bed that has been colonized with said screened microbes for a retention time sufficient to degrade at least a portion of said recalcitrant COD under aerobic conditions, wherein a $BOD_5$ of said pretreated liquid after exiting said pretreatment unit is less than 30 mg/L.

* * * * *